(12) United States Patent
Banno et al.

(10) Patent No.: US 9,564,271 B2
(45) Date of Patent: Feb. 7, 2017

(54) DIELECTRIC CERAMIC COMPOSITION, STACKED CERAMIC CAPACITOR USING THE SAME, AND METHOD OF MANUFACTURING THE SAME

(71) Applicant: Murata Manufacturing Co., Ltd., Nagaokakyo-shi, Kyoto-fu (JP)

(72) Inventors: Koichi Banno, Nagaokakyo (JP); Shoichiro Suzuki, Nagaokakyo (JP); Masaru Miyayama, Kawasaki (JP); Yuji Noguchi, Kawasaki (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 14/854,597

(22) Filed: Sep. 15, 2015

(65) Prior Publication Data
US 2016/0005541 A1  Jan. 7, 2016

Related U.S. Application Data

(63) Continuation of application No. PCT/JP2014/050075, filed on Jan. 7, 2014.

(30) Foreign Application Priority Data

Apr. 4, 2013 (JP) ................. 2013-078906

(51) Int. Cl.
*C04B 35/48* (2006.01)
*H01G 4/12* (2006.01)
(Continued)

(52) U.S. Cl.
CPC ........... *H01G 4/1254* (2013.01); *C04B 35/495* (2013.01); *H01B 3/12* (2013.01);
(Continued)

(58) Field of Classification Search
CPC ...... C04B 35/48; C04B 35/482; C04B 35/484; C04B 35/486; C04B 35/488
See application file for complete search history.

(56) References Cited

U.S. PATENT DOCUMENTS

2008/0045399 A1  2/2008 Takeda et al.
2009/0290285 A1  11/2009 Takeda
(Continued)

FOREIGN PATENT DOCUMENTS

JP  2008-189487 A  8/2008
JP  2009-249244 A  10/2009
(Continued)

OTHER PUBLICATIONS

International Search Report issued for PCT/JP2014/050075, date of mailing Feb. 10, 2014.

*Primary Examiner* — Noah Wiese
(74) *Attorney, Agent, or Firm* — Arent Fox LLP

(57) ABSTRACT

A stacked ceramic capacitor that includes a ceramic body formed by stacking dielectric ceramic layers and internal electrodes mainly composed of Ni; and an external electrode formed on an outer surface of ceramic body. The dielectric ceramic layers are formed by using a dielectric ceramic composition that includes a main ingredient expressed by $(K_a Na_b Li_c M2_d)(Nb_w Ta_x Mg_y M4_z)O_3$, where M2 is at least one of Ca, Sr and Ba, M4 is at least one of Zr, Hf and Sn, and a, b, c, d, w, x, y, and z satisfy predetermined relationships; and includes 2 to 15 molar parts of Mn with respect to 100 molar parts of a total content of Nb, Ta, Mg, and M4.

11 Claims, 2 Drawing Sheets

(51) Int. Cl.
*H01G 4/30* (2006.01)
*H01B 3/12* (2006.01)
*C04B 35/495* (2006.01)
*H01G 4/224* (2006.01)

(52) U.S. Cl.
CPC .......... *H01G 4/1209* (2013.01); *H01G 4/224* (2013.01); *H01G 4/30* (2013.01); *C04B 2235/3201* (2013.01); *C04B 2235/3203* (2013.01); *C04B 2235/3208* (2013.01); *C04B 2235/3213* (2013.01); *C04B 2235/3215* (2013.01); *C04B 2235/3244* (2013.01); *C04B 2235/3251* (2013.01); *C04B 2235/3262* (2013.01); *C04B 2235/3293* (2013.01); *C04B 2235/652* (2013.01); *C04B 2235/6584* (2013.01); *C04B 2235/786* (2013.01)

(56) References Cited

U.S. PATENT DOCUMENTS

2010/0102679 A1    4/2010   Kawada
2011/0204754 A1    8/2011   Kawada

FOREIGN PATENT DOCUMENTS

| WO | WO 2006/114914 A1 | 11/2006 |
| WO | WO 2008/102608 A1 | 8/2008 |
| WO | WO 2008/152851 A1 | 12/2008 |
| WO | WO 2010/050258 A1 | 5/2010 |

DIELECTRIC CERAMIC COMPOSITION, STACKED CERAMIC CAPACITOR USING THE SAME, AND METHOD OF MANUFACTURING THE SAME

CROSS REFERENCE TO RELATED APPLICATIONS

The present application is a continuation of International application No. PCT/JP2014/050075, filed Jan. 7, 2014, which claims priority to Japanese Patent Application No. 2013-078906, filed Apr. 4, 2013, the entire contents of each of which are incorporated herein by reference.

FIELD OF THE INVENTION

The present invention relates to a dielectric ceramic composition and a stacked ceramic capacitor using the same.

BACKGROUND OF THE INVENTION

FIG. 1 is a perspective view showing a stacked ceramic capacitor as the background art of the present invention, and FIG. 2 is an illustration diagram showing an internal structure thereof. A stacked ceramic capacitor 10 includes a ceramic body 12 having, for example, a rectangular parallelepiped shape. Ceramic body 12 includes a plurality of stacked dielectric ceramic layers 14. An internal electrode 16 is formed at an interface between these dielectric ceramic layers 14. Internal electrodes 16 face and overlap with each other at a central portion of ceramic body 12, and adjacent internal electrodes 16 are alternately led out to two end surfaces of ceramic body 12 that face in the longitudinal direction. An external electrode 18 is formed at the end surface of ceramic body 12 to which internal electrodes 16 are led out. Internal electrodes 16 led out to the respective end surfaces of ceramic body 12 are connected to two external electrodes 18. Therefore, adjacent internal electrodes 16 are alternately connected to two external electrodes 18 and a capacitance is formed between these external electrodes 18.

In order to fabricate stacked ceramic capacitor 10 described above, a ceramic slurry is formed by using a dielectric ceramic composition. This ceramic slurry is formed into a sheet shape, thereby forming a ceramic green sheet 20. As shown in FIG. 3, a plurality of internal electrode patterns 22 are formed on ceramic green sheet 20 by using a conductive paste. Ceramic green sheets 20 each having internal electrode patterns 22 are stacked, and on both sides thereof, ceramic green sheets 20 each having no internal electrode patterns are stacked as needed. Stacked ceramic green sheets 20 are pressure-bonded and a mother stacked body 24 is formed.

Mother stacked body 24 is cut and a crude stacked body chip having adjacent internal electrode patterns 22 exposed alternately to both end surfaces is formed. This stacked body chip is fired, thereby forming ceramic body 12 having dielectric ceramic layers 14 and internal electrodes 16. An electrode paste is applied and baked onto the end surface of ceramic body 12 to which internal electrodes 16 are exposed, thereby forming external electrode 18. External electrode 18 is plated as needed.

When such stacked ceramic capacitor 10 is used in, for example, a vehicle-mounted application, stacked ceramic capacitor 10 may sometimes be arranged near an engine. In such a case, the temperature around stacked ceramic capacitor 10 changes greatly, and a dielectric constant of dielectric ceramic layers 14 changes in accordance with the aforementioned temperature change, and a capacitance of stacked ceramic capacitor 10 changes in accordance therewith. However, needless to say, stacked ceramic capacitor 10 having a small rate of change in capacitance with respect to the temperature change is preferable.

Thus, disclosed is a dielectric material in which a capacitance-temperature change rate in a range of $-55°$ C. to $250°$ C. becomes $\pm 15\%$ by adding BaO, MgO and $Nb_2O_5$ to an alkali niobium-based material (K, Na, Li)(Nb, Ta)$O_3$ (refer to PTD 1).

PTD 1: Japanese Patent Laying-Open No. 2009-249244

SUMMARY OF THE INVENTION

When an inexpensive base metal such as Ni is used as a material of the conductive paste for forming the internal electrode patterns, the stacked body chip needs to be fired in a reducing atmosphere in order to prevent oxidation of such a metal. However, when the stacked body chip is fired in the reducing atmosphere, an insulation resistance of the dielectric ceramic layers decreases and use as the stacked ceramic capacitor may sometimes become impossible. This is considered to be because the dielectric ceramic layers become a semiconductor due to firing in the reducing atmosphere. Therefore, it is difficult to co-fire the internal electrode patterns formed by using the conductive paste made of the inexpensive base metal material and the ceramic green sheets formed by using the dielectric material whose insulation resistance decreases due to firing in the reducing atmosphere.

Accordingly, a main object of the present invention is to provide a dielectric ceramic composition that makes it possible to obtain a stacked ceramic capacitor having an excellent capacitance-temperature characteristic from low to high temperatures, without a decrease in insulation resistance of dielectric ceramic layers even when firing is performed in a reducing atmosphere.

Another object of the present invention is to provide a stacked ceramic capacitor having an excellent capacitance-temperature characteristic from low to high temperatures, by using the aforementioned dielectric ceramic composition.

The present invention is directed to a dielectric ceramic composition that includes a main ingredient expressed by $(K_a Na_b Li_c M2_d)(Nb_w Ta_x Mg_y M4_z)O_3$, where M2 is at least one of Ca, Sr and Ba, M4 is at least one of Zr, Hf and Sn, $w+x+y+z=1$, $0.07 \le a \le 0.92$, $0 \le b \le 0.81$, $0 \le c \le 0.09$, $0.57 \le a+b+c \le 0.95$, $0.1 \le d \le 0.4$, $0.95 \le a+b+c+d \le 1.05$, $0.73 \le w+x \le 0.93$, $0 \le x/(w+x) \le 0.3$, $0.02 \le y \le 0.07$, and $0.05 \le z \le 0.2$; and includes 2 to 15 molar parts of Mn with respect to 100 molar parts of a total content of Nb, Ta, Mg, and M4.

The present invention is also directed to a stacked ceramic capacitor comprising: a ceramic body including a plurality of stacked dielectric ceramic layers and a plurality of internal electrodes mainly composed of Ni and formed along an interface between the dielectric ceramic layers; and an external electrode formed on an outer surface of the ceramic body, wherein the dielectric ceramic layers are formed by using the aforementioned dielectric ceramic composition.

By using the dielectric ceramic composition of the present invention, it is possible to obtain the stacked ceramic capacitor having the dielectric ceramic layers whose insulation resistance does not easily decrease even when firing is performed in the reducing atmosphere. Moreover, a dielectric constant of the dielectric ceramic layers formed by using this dielectric ceramic composition does not easily change with respect to temperature change, and it is possible to obtain the stacked ceramic capacitor having a small capacitance-temperature change rate.

According to the present invention, obtained are the dielectric ceramic layers whose insulation resistance does not easily decrease even when firing is performed in the reducing atmosphere, and thus, a base metal material such as Ni can be used as a conductive paste for forming the internal electrodes, when dielectric ceramic green sheets and internal electrode patterns are co-fired. Furthermore, it is possible to obtain the stacked ceramic capacitor having a small capacitance-temperature change rate, and thus, the stacked ceramic capacitor can be used in a place where the temperature changes greatly such as in a vehicle-mounted application.

The foregoing and other objects, features, and advantages of the present invention will become more apparent from the following description of embodiments provided with reference to the drawings.

DETAILED DESCRIPTION OF THE PREFERRED EMBODIMENTS

Figure 1:
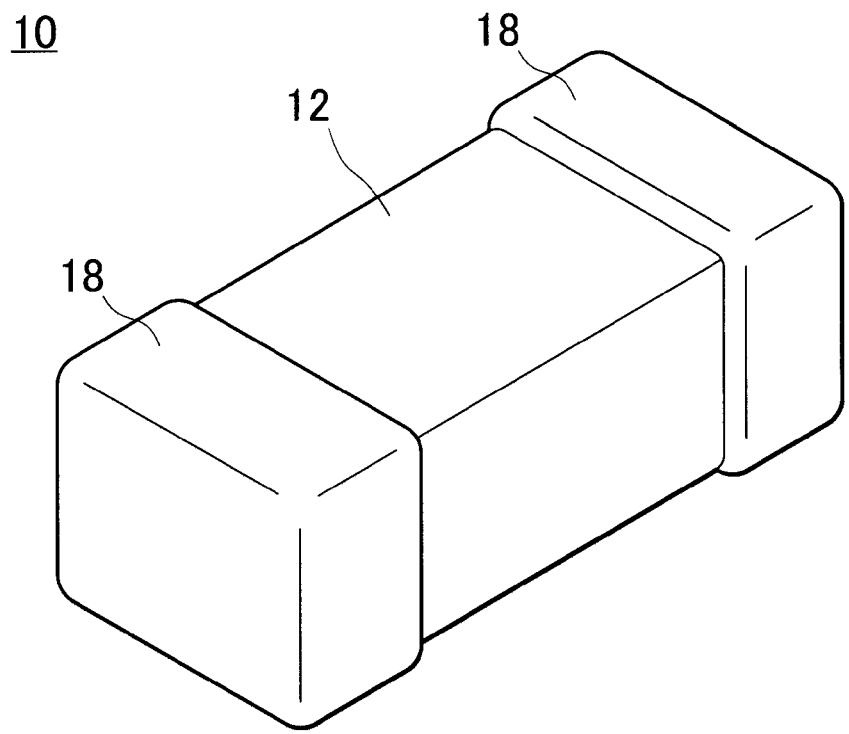
FIG. 1 is a perspective view showing a stacked ceramic capacitor as the background art of the present invention.
Figure 2:
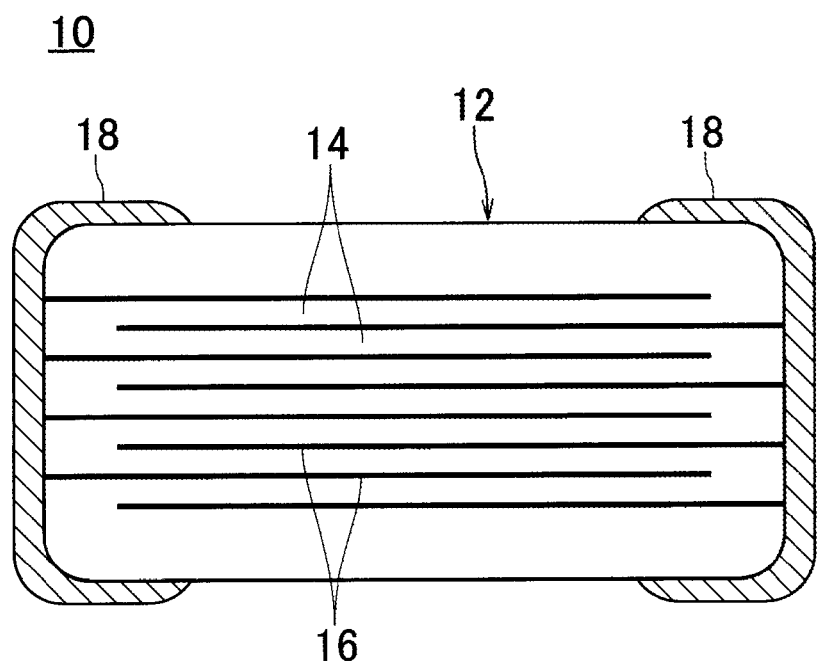
FIG. 2 is an illustration showing an internal structure of the stacked ceramic capacitor shown in FIG. 1.

A dielectric ceramic composition of the present invention is used to fabricate stacked ceramic capacitor 10 shown in FIGS. 1 and 2. In order to obtain such a dielectric ceramic composition, $K_2CO_3$, $Na_2CO_3$, $Li_2CO_3$, $Nb_2O_5$, $Ta_2O_5$, $MgCO_3$, $CaCO_3$, $SrCO_3$, $BaCO_3$, $ZrO_2$, $SnO_2$, $HfO_2$, $MnO$ and the like are prepared as ceramic raw materials.

Then, in order to obtain the dielectric ceramic composition expressed by $(K_aNa_bLi_cM2_d)(Nb_wTa_xMg_yM4_z)O_3$, the aforementioned ceramic raw materials are weighed. Here, M2 is at least one of Ca, Sr and Ba, and M4 is at least one of Zr, Hf and Sn. The ceramic raw materials are weighed to satisfy the relationships of $w+x+y+z=1$, $0.07 \le a \le 0.92$, $0 \le b \le 0.81$, $0 \le c \le 0.09$, $0.57 \le a+b+c \le 0.95$, $0.1 \le c \le 0.4$, $0.95 \le a+b+c+d \le 1.05$, $0.73 \le w+x \le 0.93$, $0 \le x/(w+x) \le 0.3$, $0.02 \le y \le 0.07$, and $0.05 \le z \le 0.2$ in the aforementioned general formula and to include 2 to 15 molar parts of Mn with respect to 100 molar parts of a total content of Nb, Ta, Mg, and M4.

Figure 3:
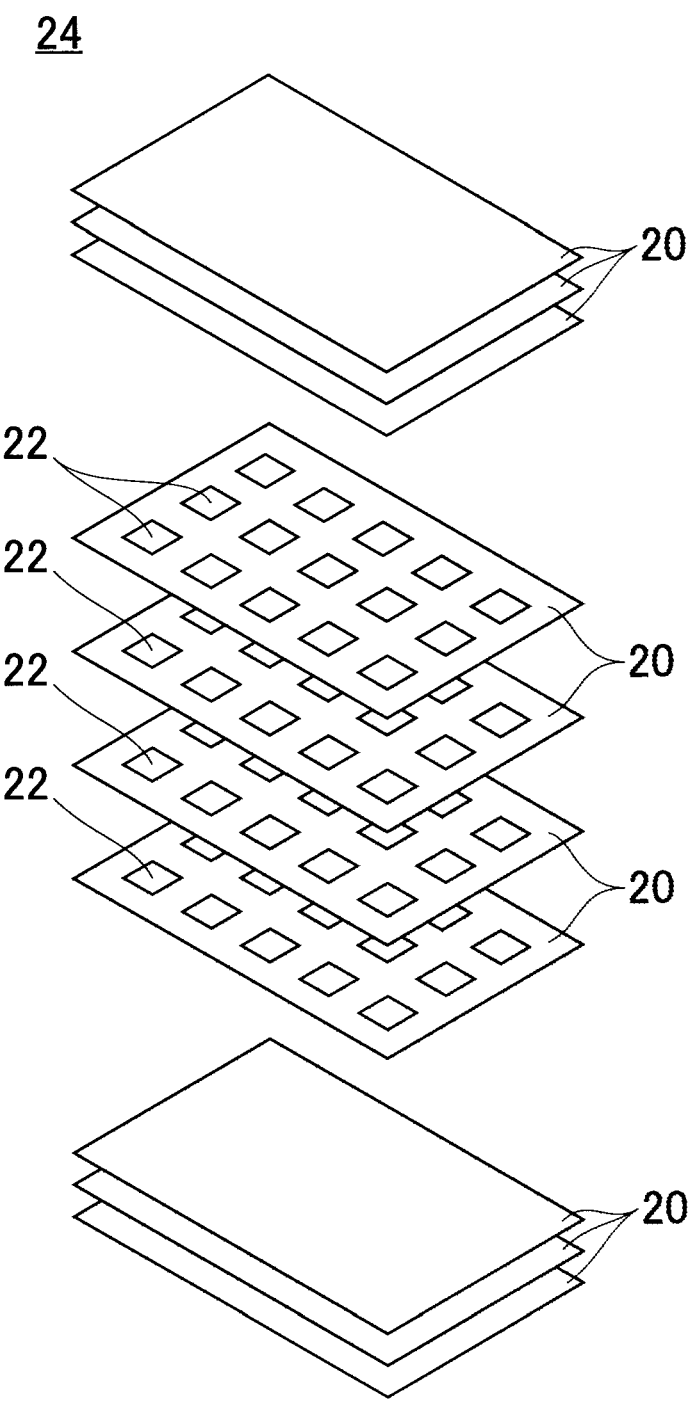
FIG. 3 is an illustration showing a part of a process for manufacturing the stacked ceramic capacitor shown in FIG. 1.

These weighed materials are put into a ball mill together with a solvent and they are wet mixed. The obtained mixture is dried and calcined to obtain a calcined material. The calcined material is crushed, and thereafter, the calcined material is put into the ball mill together with a binder, a dispersant and pure water and they are wet mixed sufficiently to obtain a ceramic slurry. The obtained ceramic slurry is molded in accordance with the doctor blade method to obtain ceramic green sheet 20 as shown in FIG. 3.

Next, a conductive paste for internal electrodes, in which a base metal such as Ni is used as a conductive material, is prepared. By using this conductive paste for the internal electrodes, internal electrode patterns 22 shown in FIG. 3 are formed on ceramic green sheet 20 in accordance with the screen printing method. Then, a plurality of ceramic green sheets 20 each having internal electrode patterns 22 formed thereon are stacked, and ceramic green sheets 20 having no internal electrode patterns formed thereon are stacked so as to sandwich the plurality of ceramic green sheets 20. These ceramic green sheets 20 are pressure-bonded to obtain mother stacked body 24.

Next, mother stacked body 24 is cut such that internal electrode patterns 22 adjacent to each other in the stack direction are alternately led out to both end surfaces, and a crude stacked body chip is formed. This stacked body chip is fired at 1000° C. to 1160° C. in the reducing atmosphere at an oxygen partial pressure of $10^{-11}$ to $10^{-10}$ MPa, to obtain ceramic body 12 including dielectric ceramic layers 14 and internal electrodes 16.

A conductive paste for an external electrode is applied and baked onto the end surface of ceramic body 12 to which internal electrodes 16 are led out, thereby forming external electrode 18 connected to the portion where internal electrodes 16 are led out. External electrode 18 is plated with Ni, Sn and the like as needed. Stacked ceramic capacitor 10 having a capacitance formed between two external electrodes 18 is thus obtained.

This dielectric ceramic composition used to manufacture stacked ceramic capacitor 10 does not easily become a semiconductor and an insulation resistance thereof does not easily decrease, even when the dielectric ceramic composition is fired in the reducing atmosphere. Therefore, the stacked body chip can be fired in the reducing atmosphere and the easily-oxidizable base metal material such as Ni can be used as the conductive material of the conductive paste for the internal electrodes. Namely, it is possible to co-fire the internal electrode patterns formed by using the conductive paste made of the inexpensive base metal material and the ceramic green sheets formed by using the dielectric ceramic composition of the present invention.

In addition, in dielectric ceramic layers 14 formed by using this dielectric ceramic composition, a rate of change in dielectric constant with respect to temperature change is small, and stacked ceramic capacitor 10 having a small capacitance-temperature change rate can be obtained. Therefore, stacked ceramic capacitor 10 can be used in a place where the temperature changes greatly, and can be used as, for example, vehicle-mounted stacked ceramic capacitor 10.

Example 1

First, the ceramic raw materials described above were prepared. Then, in order to obtain dielectric ceramic compositions expressed by $(K_aNa_bLi_cM2_d)(Nb_wTa_xMg_yM4_z)O_3$ and having the compositions shown in Tables 1 and 2, these raw materials were weighed. In Tables 1 and 2, an amount of addition of Mn indicates an amount of addition (molar part) with respect to 100 molar parts of a total amount of Nb, Ta, Mg, and M4 (Zr, Hf, Sn). In Sample No. in Tables 1 and 2, the mark of "*" indicates outside the scope of the present invention.

TABLE 1

| Sample No. | a | b | c | a + b + c | d (=d' + d") | Breakdown of M2 M2-(1) d' | Breakdown of M2 M2-(2) d" | a + b + c + d | w | x | w + x | x/(w + x) | y | M4 z | Amount of Addition Mn of |
|---|---|---|---|---|---|---|---|---|---|---|---|---|---|---|---|
| 1* | 0.41 | 0.41 | 0.05 | 0.87 | 0.13 | Ca 0.03 | Ba 0.10 | 1.00 | 0.94 | 0.00 | 0.94 | 0.00 | 0.03 | Zr 0.03 | 5 |
| 2* | 0.41 | 0.41 | 0.05 | 0.87 | 0.13 | Ca 0.04 | Ba 0.09 | 1.00 | 0.93 | 0.00 | 0.93 | 0.00 | 0.03 | Zr 0.04 | 5 |
| 3* | 0.45 | 0.45 | 0.07 | 0.97 | 0.10 | Ca 0.05 | Ba 0.05 | 1.07 | 0.93 | 0.00 | 0.93 | 0.00 | 0.02 | Zr 0.05 | 5 |

TABLE 1-continued

| Sample No. | a | b | c | a + b + c | d (=d' + d") | Breakdown of M2 M2-(1) d' | Breakdown of M2 M2-(2) d" | a + b + c + d | w | x | w + x | x/ w + x | y | M4 z | Amount of Addition Mn of |
|---|---|---|---|---|---|---|---|---|---|---|---|---|---|---|---|
| 4* | 0.45 | 0.45 | 0.00 | 0.90 | 0.08 | Ca 0.03 | Ba 0.05 | 0.98 | 0.93 | 0.00 | 0.93 | 0.00 | 0.02 | Zr 0.05 | 5 |
| 5 | 0.45 | 0.45 | 0.05 | 0.95 | 0.10 | Ca 0.05 | Ba 0.05 | 1.05 | 0.93 | 0.00 | 0.93 | 0.00 | 0.02 | Zr 0.05 | 5 |
| 6 | 0.45 | 0.45 | 0.00 | 0.90 | 0.10 | Ca 0.05 | Ba 0.05 | 1.00 | 0.93 | 0.00 | 0.93 | 0.00 | 0.02 | Zr 0.05 | 5 |
| 7 | 0.40 | 0.40 | 0.05 | 0.85 | 0.15 | Ca 0.05 | Ba 0.10 | 1.00 | 0.92 | 0.00 | 0.92 | 0.00 | 0.03 | Zr 0.05 | 5 |
| 8 | 0.38 | 0.38 | 0.05 | 0.81 | 0.19 | Ca 0.10 | Ba 0.09 | 1.00 | 0.87 | 0.00 | 0.87 | 0.00 | 0.03 | Zr 0.10 | 5 |
| 9 | 0.34 | 0.34 | 0.04 | 0.72 | 0.28 | Ca 0.20 | Ba 0.08 | 1.00 | 0.77 | 0.00 | 0.77 | 0.00 | 0.03 | Zr 0.20 | 5 |
| 10 | 0.26 | 0.26 | 0.08 | 0.60 | 0.40 | Ca 0.20 | Ba 0.20 | 1.00 | 0.73 | 0.00 | 0.73 | 0.00 | 0.07 | Zr 0.20 | 5 |
| 11 | 0.26 | 0.26 | 0.05 | 0.57 | 0.40 | Ca 0.20 | Ba 0.20 | 0.97 | 0.73 | 0.00 | 0.73 | 0.00 | 0.07 | Zr 0.20 | 5 |
| 12* | 0.26 | 0.26 | 0.08 | 0.60 | 0.40 | Ca 0.20 | Ba 0.20 | 1.00 | 0.71 | 0.00 | 0.71 | 0.00 | 0.09 | Zr 0.20 | 5 |
| 13* | 0.26 | 0.26 | 0.08 | 0.60 | 0.43 | Ca 0.23 | Ba 0.20 | 1.03 | 0.73 | 0.00 | 0.73 | 0.00 | 0.07 | Zr 0.20 | 5 |
| 14* | 0.26 | 0.26 | 0.03 | 0.55 | 0.40 | Ca 0.20 | Ba 0.20 | 0.95 | 0.73 | 0.00 | 0.73 | 0.00 | 0.07 | Zr 0.20 | 5 |
| 15* | 0.34 | 0.34 | 0.04 | 0.72 | 0.28 | Ca 0.20 | Ba 0.08 | 1.00 | 0.74 | 0.00 | 0.74 | 0.00 | 0.03 | Zr 0.23 | 5 |
| 16* | 0.38 | 0.38 | 0.05 | 0.81 | 0.19 | Ca 0.10 | Ba 0.09 | 1.00 | 0.87 | 0.00 | 0.87 | 0.00 | 0.03 | Zr 0.10 | 1 |
| 17 | 0.38 | 0.38 | 0.05 | 0.81 | 0.19 | Ca 0.10 | Ba 0.09 | 1.00 | 0.87 | 0.00 | 0.87 | 0.00 | 0.03 | Zr 0.10 | 2 |
| 18 | 0.38 | 0.38 | 0.05 | 0.81 | 0.19 | Ca 0.10 | Ba 0.09 | 1.00 | 0.87 | 0.00 | 0.87 | 0.00 | 0.03 | Zr 0.10 | 15 |
| 19* | 0.38 | 0.38 | 0.05 | 0.81 | 0.19 | Ca 0.10 | Ba 0.09 | 1.00 | 0.87 | 0.00 | 0.87 | 0.00 | 0.03 | Zr 0.10 | 20 |
| 20* | 0.40 | 0.40 | 0.05 | 0.85 | 0.15 | Ca 0.10 | Ba 0.05 | 1.00 | 0.89 | 0.00 | 0.89 | 0.00 | 0.01 | Zr 0.10 | 5 |
| 21 | 0.39 | 0.39 | 0.05 | 0.83 | 0.18 | Ca 0.10 | Ba 0.08 | 1.01 | 0.87 | 0.00 | 0.87 | 0.00 | 0.03 | Zr 0.10 | 5 |
| 22 | 0.33 | 0.33 | 0.04 | 0.70 | 0.30 | Ca 0.10 | Ba 0.20 | 1.00 | 0.83 | 0.00 | 0.83 | 0.00 | 0.07 | Zr 0.10 | 5 |
| 23* | 0.28 | 0.28 | 0.04 | 0.60 | 0.40 | Ca 0.10 | Ba 0.30 | 1.00 | 0.80 | 0.00 | 0.80 | 0.00 | 0.10 | Zr 0.10 | 5 |
| 24* | 0.95 | 0.00 | 0.00 | 0.95 | 0.10 | Ca 0.05 | Ba 0.05 | 1.05 | 0.93 | 0.00 | 0.93 | 0.00 | 0.02 | Zr 0.05 | 5 |

TABLE 2

| Sample No. | a | b | c | a + b + c | d (=d' + d") | Breakdown of M2 M2-(1) d' | Breakdown of M2 M2-(2) d" | a + b + c + d | w | x | w + x | x/ w + x | y | M4 z | Amount of Addition of Mn |
|---|---|---|---|---|---|---|---|---|---|---|---|---|---|---|---|
| 25 | 0.92 | 0.00 | 0.00 | 0.92 | 0.10 | Ca 0.05 | Ba 0.05 | 1.02 | 0.93 | 0.00 | 0.93 | 0.00 | 0.02 | Zr 0.05 | 5 |
| 26 | 0.76 | 0.00 | 0.05 | 0.81 | 0.19 | Ca 0.10 | Ba 0.09 | 1.00 | 0.87 | 0.00 | 0.87 | 0.00 | 0.03 | Zr 0.10 | 5 |
| 27 | 0.08 | 0.68 | 0.05 | 0.81 | 0.19 | Ca 0.10 | Ba 0.09 | 1.00 | 0.87 | 0.00 | 0.87 | 0.00 | 0.03 | Zr 0.10 | 5 |
| 28 | 0.07 | 0.81 | 0.00 | 0.88 | 0.12 | Ca 0.07 | Ba 0.05 | 1.00 | 0.91 | 0.00 | 0.91 | 0.00 | 0.02 | Zr 0.07 | 5 |
| 29* | 0.05 | 0.81 | 0.00 | 0.86 | 0.12 | Ca 0.07 | Ba 0.05 | 0.98 | 0.91 | 0.00 | 0.91 | 0.00 | 0.02 | Zr 0.07 | 5 |
| 30* | 0.07 | 0.83 | 0.00 | 0.90 | 0.12 | Ca 0.07 | Ba 0.05 | 1.02 | 0.91 | 0.00 | 0.91 | 0.00 | 0.02 | Zr 0.07 | 5 |
| 31 | 0.41 | 0.41 | 0.00 | 0.82 | 0.19 | Ca 0.10 | Ba 0.09 | 1.01 | 0.87 | 0.00 | 0.87 | 0.00 | 0.03 | Zr 0.10 | 5 |
| 32 | 0.36 | 0.36 | 0.08 | 0.82 | 0.19 | Ca 0.10 | Ba 0.09 | 1.01 | 0.87 | 0.00 | 0.87 | 0.00 | 0.03 | Zr 0.10 | 5 |
| 33 | 0.35 | 0.35 | 0.09 | 0.79 | 0.21 | Ca 0.06 | Ba 0.15 | 1.00 | 0.89 | 0.00 | 0.89 | 0.00 | 0.05 | Zr 0.06 | 5 |
| 34* | 0.35 | 0.35 | 0.14 | 0.84 | 0.21 | Ca 0.06 | Ba 0.15 | 1.05 | 0.89 | 0.00 | 0.89 | 0.00 | 0.05 | Zr 0.06 | 5 |
| 35 | 0.38 | 0.38 | 0.05 | 0.81 | 0.19 | Ca 0.10 | Ba 0.09 | 1.00 | 0.63 | 0.24 | 0.87 | 0.28 | 0.03 | Zr 0.10 | 5 |
| 36 | 0.38 | 0.38 | 0.05 | 0.81 | 0.19 | Ca 0.10 | Ba 0.09 | 1.00 | 0.61 | 0.26 | 0.87 | 0.30 | 0.03 | Zr 0.10 | 5 |
| 37* | 0.38 | 0.38 | 0.05 | 0.81 | 0.19 | Ca 0.10 | Ba 0.09 | 1.00 | 0.55 | 0.32 | 0.87 | 0.37 | 0.03 | Zr 0.10 | 5 |
| 38 | 0.38 | 0.38 | 0.05 | 0.81 | 0.19 | Ba 0.19 | — | 1.00 | 0.87 | 0.00 | 0.87 | 0.00 | 0.03 | Zr 0.10 | 5 |
| 39 | 0.38 | 0.38 | 0.05 | 0.81 | 0.19 | Sr 0.10 | Ba 0.09 | 1.00 | 0.87 | 0.00 | 0.87 | 0.00 | 0.03 | Zr 0.10 | 5 |
| 40 | 0.38 | 0.38 | 0.05 | 0.81 | 0.19 | Ca 0.19 | — | 1.00 | 0.87 | 0.00 | 0.87 | 0.00 | 0.03 | Hf 0.10 | 5 |
| 41 | 0.38 | 0.38 | 0.05 | 0.81 | 0.19 | Ca 0.10 | Sr 0.09 | 1.00 | 0.87 | 0.00 | 0.87 | 0.00 | 0.03 | Sn 0.10 | 5 |
| 42* | 0.36 | 0.36 | 0.02 | 0.74 | 0.19 | Ca 0.10 | Ba 0.09 | 0.93 | 0.87 | 0.00 | 0.87 | 0.00 | 0.03 | Zr 0.10 | 5 |
| 43 | 0.36 | 0.36 | 0.04 | 0.76 | 0.19 | Ca 0.10 | Ba 0.09 | 0.95 | 0.87 | 0.00 | 0.87 | 0.00 | 0.03 | Zr 0.10 | 5 |
| 44 | 0.36 | 0.36 | 0.05 | 0.77 | 0.19 | Ca 0.10 | Ba 0.09 | 0.96 | 0.87 | 0.00 | 0.87 | 0.00 | 0.03 | Zr 0.10 | 5 |
| 45 | 0.40 | 0.40 | 0.05 | 0.85 | 0.19 | Ca 0.10 | Ba 0.09 | 1.04 | 0.87 | 0.00 | 0.87 | 0.00 | 0.03 | Zr 0.10 | 5 |
| 46 | 0.40 | 0.40 | 0.06 | 0.86 | 0.19 | Ca 0.10 | Ba 0.09 | 1.05 | 0.87 | 0.00 | 0.87 | 0.00 | 0.03 | Zr 0.10 | 5 |
| 47* | 0.40 | 0.40 | 0.08 | 0.88 | 0.19 | Ca 0.10 | Ba 0.09 | 1.07 | 0.87 | 0.00 | 0.87 | 0.00 | 0.03 | Zr 0.10 | 5 |

These weighed materials were put into the ball mill and wet mixed for about 90 hours by using ethanol as a solvent. The obtained mixture was dried, and thereafter, was calcined at a temperature of 750° C. to obtain a calcined material. This calcined material was crushed, and the calcined material was put into the ball mill together with a binder, a dispersant and pure water and they were wet mixed sufficiently to obtain a ceramic slurry. This ceramic slurry was molded in accordance with the doctor blade method to obtain a ceramic green sheet having a thickness of 100 μm.

Next, a conductive paste for internal electrodes, in which Ni was used as a conductive material, was prepared. By using this conductive paste for the internal electrodes, internal electrode patterns having a prescribed shape were formed on the ceramic green sheet in accordance with the screen printing method. 11 ceramic green sheets each having the internal electrode patterns formed thereon were stacked, and ceramic green sheets having no internal electrodes formed thereon were stacked so as to sandwich the 11 ceramic green sheets. Then, a pressure of about $2.45 \times 10^7$ Pa was applied to pressure-bond these ceramic green sheets, and a mother stacked body was thus obtained. This mother stacked body was cut to obtain a crude stacked body chip.

The obtained stacked body chip was fired for two hours at a temperature of 1100° C. in the reducing atmosphere adjusted to attain an oxygen partial pressure of $3.8 \times 10^{-11}$ MPa, and a ceramic body having dielectric ceramic layers and internal electrodes was thus obtained. The obtained ceramic body had a 2012 size, the dielectric ceramic layer had a thickness of $10 \times 10^{-6}$ m, the internal electrode had a thickness of $2.0 \times 10^{-6}$ m, and a portion where the internal electrodes faced each other (portion where a capacitance was formed) had an area of $1.7 \times 10^{-6}$ m$^2$.

Next, a conductive paste for an external electrode, in which Ag was used as a conductive material, was prepared. Then, the conductive paste for the external electrode was applied and baked at 900° C. onto a portion of the obtained ceramic body where the internal electrodes were led out. The external electrode was thus formed.

Electrical characteristic evaluation was performed on the stacked ceramic capacitor thus obtained. For the electrical characteristic evaluation, 20 stacked ceramic capacitors including the dielectric ceramic composition having each composition shown in Table 1 and 20 stacked ceramic capacitors including the dielectric ceramic composition having each composition shown in Table 2 were prepared. For these stacked ceramic capacitors, a capacitance C was measured under the conditions of 1 kHz, 1 Vrms and 25° C. by using an automatic bridge-type measuring instrument, and an average value of dielectric constants $\in$ of the dielectric ceramic layers was calculated. In addition, by using the capacitance of the stacked ceramic capacitor at 25° C. as a reference, a capacitance-temperature change rate was measured, with the temperature being changed in a range of −55° C. to 250° C. The capacitance-temperature change rate was calculated by measuring the capacitance of the stacked ceramic capacitor under the conditions of 1 MHz and 1 Vrms. The capacitance-temperature change rate of the stacked ceramic capacitor corresponds to a rate of change in dielectric constant of the dielectric ceramic layers with respect to the temperature. The measurement results were shown in Tables 3 and 4.

TABLE 3

| Sample No. | Dielectric Constant at 25° C. | Dielectric Constant Maximum Increase Rate (%) | Maximum Decrease Rate (%) | Capacitance-Temperature Change Rate (%) | | | | | | | | |
|---|---|---|---|---|---|---|---|---|---|---|---|---|
| | | | | −55° C. | −40° C. | 0° C. | 85° C. | 105° C. | 125° C. | 150° C. | 200° C. | 250° C. |
| 1* | low resistance | | | | | | | | | | | |
| 2* | sintering is impossible | | | | | | | | | | | |
| 3* | sintering is impossible | | | | | | | | | | | |
| 4* | low resistance | | | | | | | | | | | |
| 5 | 6405 | 6.0 | −41.6 | −22.7 | −18.0 | −4.9 | 6.0 | 5.5 | 2.4 | −4.6 | −23.7 | −41.6 |
| 6 | 4351 | 17.8 | −28.0 | −28.0 | −22.8 | −8.9 | 14.3 | 16.8 | 17.8 | 16.6 | 2.3 | −19.6 |
| 7 | 4684 | 0.0 | −79.6 | −62.5 | −50.4 | −16.1 | −11.7 | −26.4 | −42.6 | −59.2 | −76.0 | −79.6 |
| 8 | 1088 | 0.4 | −61.3 | −11.6 | −7.8 | 0.4 | −14.6 | −22.0 | −29.6 | −38.4 | −52.5 | −61.3 |
| 9 | 632 | 13.4 | −52.3 | 13.4 | 12.2 | 7.0 | −20.2 | −26.5 | −32.4 | −38.7 | −47.4 | −52.3 |
| 10 | 409 | 17.3 | −26.7 | 17.3 | 14.0 | 5.5 | −8.1 | −10.9 | −13.0 | −15.7 | −21.1 | −26.7 |
| 11 | 427 | 15.9 | −25.5 | 15.9 | 12.6 | 5.3 | −7.4 | −10.2 | −12.4 | −15.1 | −20.6 | −25.5 |
| 12* | low resistance | | | | | | | | | | | |
| 13* | 389 | 24.0 | −25.2 | 24.0 | 19.3 | 6.6 | −7.1 | −9.9 | −12.1 | −14.9 | −20.3 | −25.2 |
| 14* | 405 | 22.5 | −23.9 | 22.5 | 17.9 | 6.4 | −6.5 | −9.3 | −11.5 | −14.2 | −19.7 | −23.9 |
| 15* | low resistance | | | | | | | | | | | |
| 16* | low resistance | | | | | | | | | | | |
| 17 | 592 | 0.0 | −49.4 | −9.7 | −6.8 | 0.0 | −12.1 | −18.9 | −25.9 | −34.1 | −46.8 | −49.4 |
| 18 | 927 | 0.0 | −73.4 | −26.9 | −19.1 | −1.4 | −24.5 | −36.1 | −46.6 | −56.6 | −68.7 | −73.4 |
| 19* | low resistance | | | | | | | | | | | |
| 20* | 786 | 39.7 | −28.8 | −28.8 | −23.6 | −9.9 | 30.1 | 36.5 | 39.7 | 38.4 | 21.3 | −4.6 |
| 21 | 1110 | 3.0 | −48.5 | −34.7 | −27.9 | −9.9 | 3.0 | 0.0 | −5.2 | −13.9 | −33.1 | −48.5 |
| 22 | 768 | 20.0 | −60.4 | 20.0 | 17.9 | 9.7 | −25.9 | −33.4 | −40.0 | −46.6 | −56.5 | −60.4 |
| 23* | 663 | 30.3 | −58.0 | 30.3 | 25.9 | 11.8 | −27.1 | −34.4 | −40.3 | −46.2 | −54.0 | −58.0 |
| 24* | 3268 | 33.3 | −30.3 | −30.3 | −25.2 | −10.7 | 23.0 | 30.2 | 33.3 | 31.9 | 15.7 | −9.0 |

TABLE 4

| Sample No. | Dielectric Constant at 25° C. | Dielectric Constant Maximum Increase Rate (%) | Maximum Decrease Rate (%) | Capacitance-Temperature Change Rate (%) | | | | | | | | |
|---|---|---|---|---|---|---|---|---|---|---|---|---|
| | | | | −55° C. | −40° C. | 0° C. | 85° C. | 105° C. | 125° C. | 150° C. | 200° C. | 250° C. |
| 25 | 3884 | 18.8 | −32.8 | −32.8 | −26.5 | −10.2 | 15.2 | 17.7 | 18.8 | 18.8 | 6.5 | −13.1 |
| 26 | 996 | 0.1 | −11.8 | −11.8 | −8.0 | 0.1 | −14.0 | −21.5 | −29.1 | −38.0 | −52.2 | −61.1 |
| 27 | 1016 | 0.4 | −11.6 | −11.6 | −7.8 | 0.4 | −14.6 | −22.0 | −29.6 | −38.4 | −52.5 | −61.3 |
| 28 | 4015 | 18.7 | −29.0 | −29.0 | −23.8 | −9.1 | 15.2 | 17.7 | 18.7 | 17.5 | 0.9 | −23.3 |
| 29* | 3528 | 33.7 | −31.4 | −31.4 | −26.5 | −10.1 | 24.5 | 30.6 | 33.7 | 31.6 | 7.2 | −21.6 |
| 30* | 3586 | 31.1 | −29.4 | −29.4 | −24.3 | −9.7 | 21.1 | 27.4 | 31.1 | 27.3 | 1.7 | −25.3 |
| 31 | 1326 | 9.1 | −63.0 | 8.9 | 9.1 | 6.7 | −23.5 | −31.2 | −38.2 | −45.7 | −56.3 | −63.0 |
| 32 | 1198 | 0.0 | −58.2 | −16.9 | −13.2 | −3.1 | −8.4 | −15.0 | −22.3 | −31.7 | −47.8 | −58.2 |
| 33 | 1229 | 0.0 | −51.7 | −20.0 | −16.2 | −6.0 | −1.1 | −6.2 | −13.0 | −22.4 | −39.4 | −51.7 |
| 34* | sintering is impossible | | | | | | | | | | | |
| 35 | 964 | 19.7 | −57.2 | 19.7 | 18.4 | 8.6 | −23.8 | −31.4 | −37.6 | −43.8 | −52.8 | −57.2 |
| 36 | 945 | 21.0 | −58.0 | 21.0 | 19.6 | 9.8 | −24.0 | −32.1 | −38.3 | −44.4 | −53.8 | −58.0 |
| 37* | 849 | 46.5 | −56.0 | 46.5 | 37.8 | 14.2 | −26.4 | −32.3 | −37.7 | −43.4 | −51.5 | −56.0 |
| 38 | 1116 | 1.0 | −62.2 | −11.0 | −7.1 | 1.0 | −15.3 | −22.7 | −30.3 | −39.1 | −53.3 | −62.2 |
| 39 | 1092 | 0.9 | −61.8 | −11.1 | −7.2 | 0.9 | −15.0 | −22.4 | −30.0 | −38.8 | −52.9 | −61.8 |
| 40 | 1078 | 0.4 | −61.3 | −11.6 | −7.8 | 0.4 | −14.6 | −22.0 | −29.6 | −38.4 | −52.5 | −61.3 |

TABLE 4-continued

| | Dielectric Constant | | | Capacitance-Temperature Change Rate (%) | | | | | | | | |
|---|---|---|---|---|---|---|---|---|---|---|---|---|
| Sample No. | Dielectric Constant at 25° C. | Maximum Increase Rate (%) | Maximum Decrease Rate (%) | −55° C. | −40° C. | 0° C. | 85° C. | 105° C. | 125° C. | 150° C. | 200° C. | 250° C. |
| 41 | 1139 | 1.6 | −62.5 | −10.5 | −6.6 | 1.6 | −15.7 | −23.1 | −30.7 | −39.5 | −53.7 | −62.5 |
| 42* | | low resistance | | | | | | | | | | |
| 43 | 1176 | 2.1 | −59.8 | −10.1 | −6.2 | 2.1 | −14.9 | −22.2 | −29.8 | −38.0 | −50.8 | −59.8 |
| 44 | 1150 | 2.4 | −61.7 | −9.9 | −5.9 | 2.4 | −15.5 | −22.8 | −30.3 | −39.0 | −53.0 | −61.7 |
| 45 | 1003 | 0.9 | −61.5 | −11.2 | −7.3 | 0.9 | −14.2 | −21.7 | −29.6 | −38.4 | −52.7 | −61.5 |
| 46 | 988 | 0.0 | −58.2 | −12.1 | −8.3 | −0.7 | −14.4 | −21.3 | −29.2 | −37.8 | −51.1 | −58.2 |
| 47* | | sintering is impossible | | | | | | | | | | |

In Tables 3 and 4, "low resistance" indicates that a resistance value was equal to or lower than 10 kΩ. This is presumed to be because the dielectric ceramic layers became a semiconductor due to firing in the reducing atmosphere.

As can be seen from Tables 3 and 4, when the dielectric ceramic composition of the present invention is used, the resistance value of the dielectric ceramic layers does not easily decrease even when firing is performed in the reducing atmosphere. Moreover, it is possible to obtain a stacked ceramic capacitor having such an excellent capacitance-temperature characteristic that a maximum increase rate is within +22% and a maximum decrease rate is within −82% with respect to the capacitance at 25° C. in the temperature range of −55° C. to 250° C.

REFERENCE SIGNS LIST

10 stacked ceramic capacitor;
12 ceramic body;
14 dielectric ceramic layer;
16 internal electrode;
18 external electrode;
20 ceramic green sheet;
22 internal electrode pattern;
24 mother stacked body.

The invention claimed is:

1. A dielectric ceramic composition comprising:
a main ingredient expressed by $(K_aNa_bLi_cM2_d)(Nb_wTa_xMg_yM4_z)O_3$, where
M2 is at least one of Ca, Sr and Ba,
M4 is at least one of Zr, Hf and Sn,
$w+x+y+z=1$,
$0.07 \leq a \leq 0.92$,
$0 \leq b \leq 0.81$,
$0 \leq c \leq 0.09$,
$0.57 \leq a+b+c \leq 0.95$,
$0.1 \leq d \leq 0.4$,
$0.95 \leq a+b+c+d \leq 1.05$,
$0.73 \leq w+x \leq 0.93$,
$0 \leq x/(w+x) \leq 0.3$,
$0.02 \leq y \leq 0.07$, and
$0.05 \leq z \leq 0.2$; and
2 to 15 molar parts of Mn with respect to 100 molar parts of a total content of Nb, Ta, Mg, and M4.

2. A stacked ceramic capacitor comprising:
a ceramic body including a plurality of stacked dielectric ceramic layers and a plurality of internal electrodes comprising Ni along an interface between said dielectric ceramic layers; and
an external electrode on an outer surface of said ceramic body, wherein
said dielectric ceramic layers comprise the dielectric ceramic composition as recited in claim 1.

3. A method of forming a stacked ceramic capacitor, the method comprising:
forming a plurality of ceramic green sheets from a dielectric ceramic composition;
forming an internal electrode patterns comprising Ni on respective ceramic green sheets of the plurality of ceramic green sheets;
stacking the plurality of ceramic green sheets such that the internal electrode patterns are at an interface between adjacent ceramic green sheets to form a stacked body; and
firing the stacked body in a reducing atmosphere to obtain a ceramic body,
wherein the dielectric ceramic composition comprises:
a main ingredient expressed by $(K_aNa_bLi_cM2_d)(Nb_wTa_xMg_yM4_z)O_3$, where
M2 is at least one of Ca, Sr and Ba,
M4 is at least one of Zr, Hf and Sn,
$w+x+y+z=1$,
$0.07 \leq a \leq 0.92$,
$0 \leq b \leq 0.81$,
$0 \leq c \leq 0.09$,
$0.57 \leq a+b+c \leq 0.95$,
$0.1 \leq d \leq 0.4$,
$0.95 \leq a+b+c+d \leq 1.05$,
$0.73 \leq w+x \leq 0.93$,
$0 \leq x/(w+x) \leq 0.3$,
$0.02 \leq y \leq 0.07$, and
$0.05 \leq z \leq 0.2$; and
2 to 15 molar parts of Mn with respect to 100 molar parts of a total content of Nb, Ta, Mg, and M4.

4. The method of forming a stacked ceramic capacitor according to claim 3, the method further comprising:
applying a conductive paste to an end surface of the ceramic body and baking the conductive paste to form an external electrode.

5. The method of forming a stacked ceramic capacitor according to claim 3, wherein the stacked body is fired at 1000° C. to 1160° C. in the reducing atmosphere at an oxygen partial pressure of $10^{-11}$ to $10^{-10}$ MPa.

6. The dielectric ceramic composition according to claim 1, wherein $1.4 \leq d/z \leq 3.0$.

7. The stacked ceramic capacitor according to claim 2, wherein $1.4 \leq d/z \leq 3.0$.

8. The method of forming a stacked ceramic capacitor according to claim 3, wherein $1.4 \leq d/z \leq 3.0$.

9. The dielectric ceramic composition according to claim 1, wherein $0.5 \leq d/z \leq 8.0$.

10. The stacked ceramic capacitor according to claim 2, wherein $0.5 \leq d/z \leq 8.0$.

11. The method of forming a stacked ceramic capacitor according to claim 3, wherein $0.5 \leq d/z \leq 8.0$.

* * * * *